United States Patent
Showalter

(10) Patent No.: US 8,500,590 B2
(45) Date of Patent: Aug. 6, 2013

(54) ELECTROMAGNETIC CLUTCH DISCONNECT FOR ACCESSORY DRIVE

(75) Inventor: Dan Joseph Showalter, Plymouth, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 194 days.

(21) Appl. No.: 13/036,617

(22) Filed: Feb. 28, 2011

(65) Prior Publication Data

US 2011/0319214 A1 Dec. 29, 2011

Related U.S. Application Data

(60) Provisional application No. 61/357,798, filed on Jun. 23, 2010.

(51) Int. Cl.
F16H 48/06 (2006.01)

(52) U.S. Cl.
USPC .......................................... 475/154; 475/312

(58) Field of Classification Search
USPC ............. 475/5, 149, 150, 154, 311, 312, 314; 180/53.8; 192/90
See application file for complete search history.

(56) References Cited

U.S. PATENT DOCUMENTS

| | | | |
|---|---|---|---|
| 4,663,989 A * | 5/1987 | Brodbeck | 475/159 |
| 6,412,613 B1 * | 7/2002 | Lu | 188/171 |
| 7,144,347 B2 * | 12/2006 | Kushino | 475/249 |
| 7,282,003 B2 | 10/2007 | Klemen et al. | |
| 7,316,628 B2 * | 1/2008 | Serkh | 475/312 |
| 7,334,560 B2 | 2/2008 | Clark | |
| 7,547,264 B2 | 6/2009 | Usoro | |
| 2007/0142145 A1 | 6/2007 | Namuduri | |
| 2007/0213151 A1 | 9/2007 | Usoro | |
| 2008/0020875 A1 | 1/2008 | Serrels et al. | |
| 2008/0039263 A1 | 2/2008 | Usoro | |
| 2008/0051242 A1 * | 2/2008 | Usoro | 475/5 |
| 2008/0099256 A1 | 5/2008 | Holmes et al. | |
| 2008/0103679 A1 * | 5/2008 | Ruiz | 701/106 |
| 2009/0298646 A1 | 12/2009 | Parsons | |
| 2011/0065543 A1 * | 3/2011 | Usoro | 475/5 |

* cited by examiner

Primary Examiner — Justin Holmes
Assistant Examiner — Huan Le
(74) Attorney, Agent, or Firm — Helmholdt Law PLC; Thomas D. Helmholdt

(57) ABSTRACT

An automotive accessory drive system for a motor vehicle connects to an internal combustion engine crankshaft during at least one mode of operation. The system includes an accessory drive pulley, a starter motor/generator, and an endless loop power transmission member connecting at least the starter motor/generator and the accessory drive pulley. A planetary gear set includes a sun gear, a ring gear integrally associated with the accessory drive pulley, and a planetary carrier connected to the engine crankshaft. First and second one way clutches connect the engine crankshaft to the ring gear, and the sun gear to a grounding member, respectively, to define a normal drive mode and an engine start mode, respectively. An electromagnetic disconnect includes a normally closed friction clutch connecting the grounding member to ground to define a third mode of operation corresponding to a free wheel function with the grounding member disengaged from connection to ground.

14 Claims, 2 Drawing Sheets

ELECTROMAGNETIC CLUTCH DISCONNECT FOR ACCESSORY DRIVE

CROSS-REFERENCE TO RELATED APPLICATIONS

This application is a non-provisional application of and claims the benefit of U.S. Provisional Patent Application Ser. No. 61/357,798 filed on Jun. 23, 2010, which is incorporated by reference herein in its entirety.

FIELD OF THE INVENTION

The invention relates to an electromagnetic clutch for use with an accessory drive allowing accessories to be driven with the starter motor/generator while the engine is off in a vehicle equipped with a stop start engine system.

BACKGROUND

Accessories, by way of example and not limitation, such as an air conditioning compressor, power steering, and/or an alternator, in a hybrid vehicle may require power while the internal combustion engine is off and the vehicle is being powered by an electric motor/generator. Additionally, power is required to restart an internal combustion engine after it is turned off. Automotive accessory drive systems typically include a drive pulley connected to an engine output shaft, an endless loop power transmission member, such as a flexible chain or belt connecting the drive pulley with a plurality of driven pulleys operatively connected to corresponding accessories. Various automotive accessory drive systems are generally known, such as those disclosed in U.S. Pat. No. 7,282,003; U.S. Pat. No. 7,334,560; U.S. Pat. No. 7,547,264; U.S. Published Application No. 2007/0142145; U.S. Published Application No. 2007/0213151; U.S. Published Application No. 2008/0020875; U.S. Published Application No. 2008/0039263; U.S. Published Application No. 2008/0099256; U.S. Published Application No. 2008/0103679; and U.S. Published Application No. 2009/0298646.

SUMMARY

This invention relates to an electromagnetic clutch to be used in conjunction with a two speed accessory drive yielding a third mode of operation, where the accessories can be driven with the starter motor/generator while the engine is off. This allows normal function of all accessories in a vehicle which is equipped with a stop start system.

The base accessory drive contains a planetary gear set where the ring gear is functionally one with the accessory drive pulley and the planetary carrier is splined to the engine crankshaft. With two one way clutches unidirectionally connecting the engine crankshaft to the ring gear and the sun gear to a grounding member respectively, there are two modes created. The first mode is a normal drive mode where the crankshaft drives the accessory drive pulley at a 1 to 1 ratio. The second mode is an engine start mode where the starter motor/generator is provided with a ratio greater than 1.5 to 1 for engine starting which facilitates a stop start function of the internal combustion engine yielding improved fuel economy and reduced carbon dioxide emissions. When the grounding member is connected to ground through a normally closed friction clutch, which can be disengaged to provide a third mode of operation for the accessory drive. This mode is a freewheel function allowing the accessories to be driven by the starter motor/generator. The inclusion of this third mode allows uninterrupted operation of the vehicle air conditioning, as well as other mechanisms driven by the accessory belt, such as vacuum pumps or power steering pumps.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

As used herein the term "one-way clutch" is defined as a clutch which automatically couples two rotatable parts together for joint rotation when a first of the parts rotates in a first direction, but which automatically uncouples the parts when the first of the parts rotates in a direction opposite to the first direction, or uncouples the parts when the second part rotates faster than the first part. The term "clutch" is defined as a mechanism to selectively or automatically couple two relatively moving parts together for common movement or to uncouple such parts. The term "planet carrier" is defined as a device mounted for rotation about a first axis, and carrying a planet pinion, the planet pinion having a second rotational axis. The term "planet pinion" is defined as a gear mounted on the planet carrier, the planet carrier rotatable about a first axis, and the gear rotatable about a second axis. The term "sun gear" is defined as a gear mounted for rotation about the same axis as the rotational axis of a planet carrier and having a drive face contacting a drive face of a planet pinion between the axis of the planet pinion and the axis of the planet carrier. The term "ring gear" or "orbit gear" is defined as a gear mounted for rotation about the same axis as a planet carrier and having a drive face contacting a drive face of a planet pinion at a location radially outward from the rotational axis of the planet pinion. The term "speed ratio" is defined as a rotational velocity of an output member divided by the rotational velocity of an input member. The term "input member" is defined as a mechanism which receives rotational power from a power source, and transfers such rotational power to a planetary gear transmission. The term "output member" is defined as a mechanism which receives rotational power from a planetary gear transmission and transfers such power to a load device. The term "power source" is defined as an agency for supplying rotational power to an input member of a planetary gear transmission. The term "load device" is defined as a mechanism which receives rotational power form an output member to put such rotational power to useful work. The term "drive train" is defined as a mechanism including a group of interconnected elements which transfers rotational power from a power source to a load device. The term "brake" is defined as a mechanism to selectively or automatically stop a moving part with respect to a stationary part.

Figure 1:
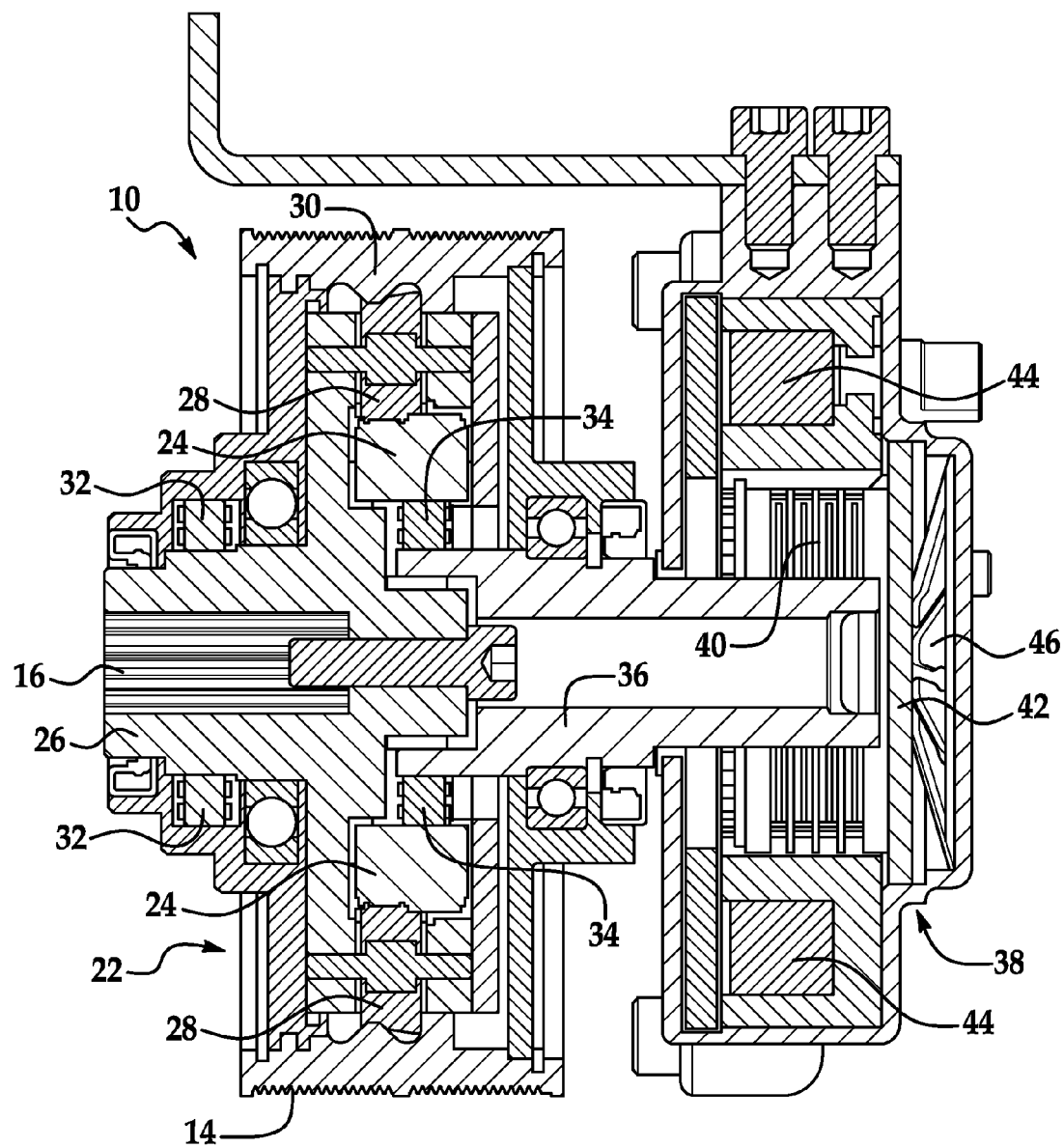
FIG. 1 is a cross-sectional view of an electromagnetic clutch disconnect for accessory drive.
Figure 2:
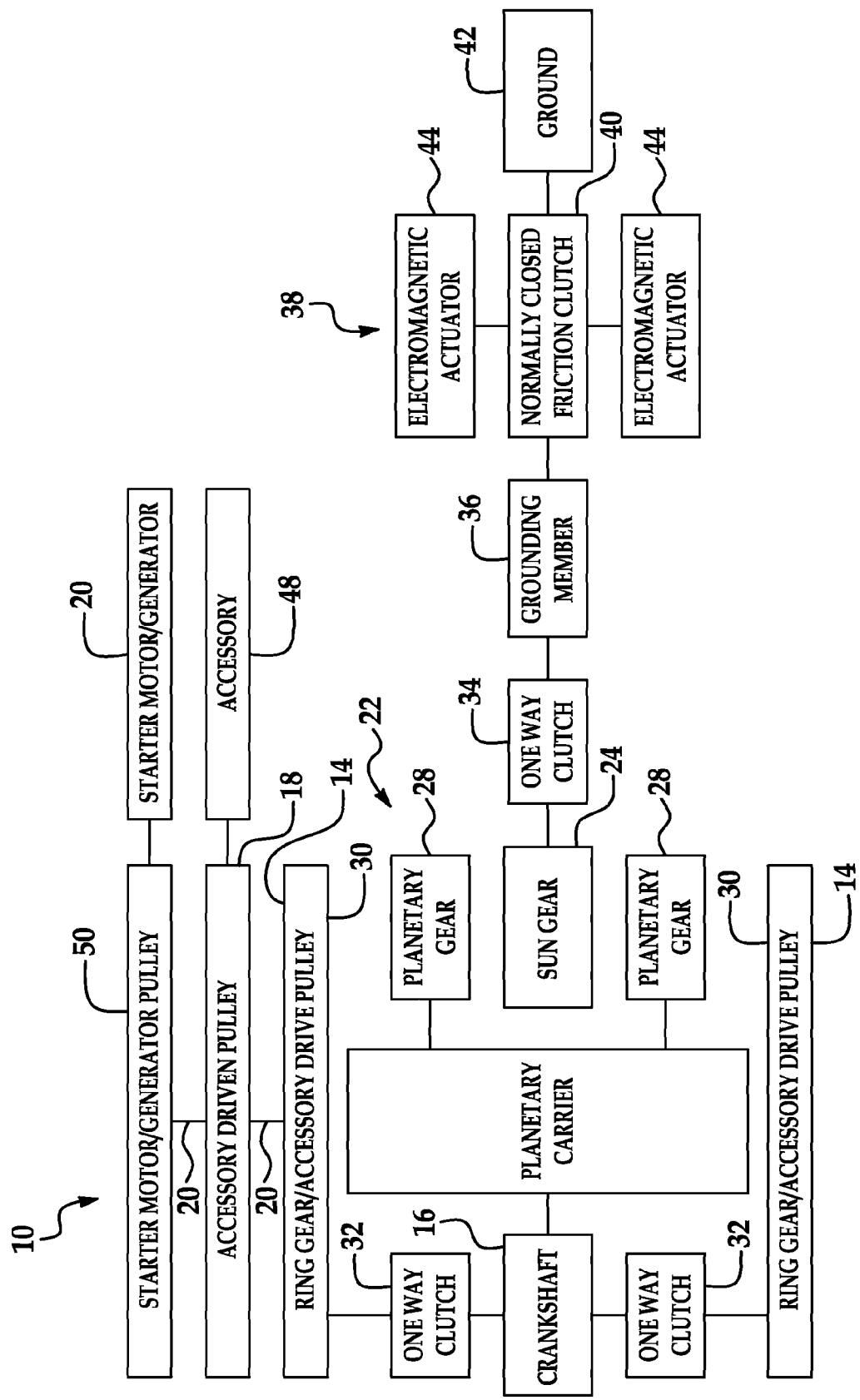
FIG. 2 is a schematic diagram of the electromagnetic clutch disconnect for accessory drive of FIG. 1.

Referring to FIGS. 1 and 2, an accessory drive system 10 of a motor vehicle can include a starter motor/generator 12, an accessory drive pulley 14 connected to an internal combustion engine crankshaft 16 during at least one mode of operation, at least one accessory driven pulley 18, and an endless loop power transmission member 20 connecting at least the starter motor/generator 12 and the accessory drive pulley 14 to one another. A planetary gear power transmission 22 can have a sun gear 24 interacting with a planetary gear carrier 26 connect to the engine crankshaft 16. The planetary gear carrier 26 can support a plurality of planetary gears 28. Each gear 24, 28 can have a central axis and wherein, during at least one mode of operation, the axes of the planetary gears 28 follow a path extending around the axis of the sun gear 24. A ring gear 30 can be integrally associated with the accessory drive pulley 14 and can interact with the plurality of planetary gears 28. A first one way clutch 32 can unidirectionally connect the engine crankshaft 16 to the ring gear 30. A second one way clutch 34 can unidirectionally connect the sun gear 24 to a grounding member 36.

As can be seen summarized in the table below, the first and second one way clutches 32, 34 operate to define two modes of operation. A first mode of operation corresponds to a normal drive mode, and a second mode of operation corresponds to an engine start mode. The normal drive mode can include the engine crankshaft 16 driving the accessory drive pulley 14 with the first one way clutch 32 engaged and the second one way clutch 34 overrunning. The engine start mode can include the starter motor/generator 12 driving the accessory drive pulley 14 with the first one way clutch 32 overrunning and the second one way clutch 34 engaged.

| ELEMENT | CONNECTION | MODE 1 (normal) | MODE 2 (starting) | MODE 3 (free wheel) |
|---|---|---|---|---|
| 1$^{st}$ one way clutch 32 | engine crankshaft 16 accessory drive pulley 14/ring gear 30 | engaged | overrunning | overrunning |
| 2$^{nd}$ one way clutch 34 | sun gear 24 grounding member 36 | overrunning | engaged | engaged |
| normally closed friction clutch | grounding member 36 ground 42 | closed | closed | open |

An electromagnetic disconnect 38 can include a normally closed friction clutch 40 connecting the grounding member 36 to ground 42. The electromagnetic disconnect 38 can operate to define a third mode of operation corresponding to a free wheel mode. The free wheel mode can include the normally closed friction clutch 40 electromagnetically disengaged to release the grounding member 36 from connection to ground 42. In this mode of operation, the starter motor/generator 12 drives the starter motor/generator pulley 50, i.e. with the starter motor/generator 12 operating in motor mode, which drives at least one accessory driven pulley 18 and the corresponding connected accessory 48, while the accessory drive pulley turns freely with respect to the crankshaft 16 and with respect to ground 42.

In operation, the engine crankshaft 16 can drive the accessory drive pulley 14 at a 1 to 1 ratio. The starter motor/generator 12 can drive the accessory drive pulley 14 at a ratio greater than 1.5 to 1. The starter motor/generator 12 can drive the accessory drive pulley 14 to drive the engine crankshaft 16 for engine starting to facilitate a stop start function of an internal combustion engine to yield improved fuel economy and reduced carbon dioxide emission. The free wheel mode can include the grounding member 36 disengaged from connection to ground 42 allowing the accessory drive pulley 14 to be driven by the starter motor/generator 12 with the first one way clutch 32 overrunning, the second one way clutch 34 engaged, and the normally closed friction clutch 40 electromagnetically driven by the electromagnetic actuator 44 open allowing the grounding member 36 to freely rotate. In the first and second modes of operation, the normally closed friction clutch 40 is biased to a closed position by spring 46, best seen in FIG. 1, with the electromagnetic actuator 44 deenergized.

Accordingly, a method is disclosed for driving accessory driven pulleys 18 and connected accessories 48 with a starter motor/generator 12 in at least one mode of operation during absence of internal combustion engine crankshaft 16 rotation with an accessory drive system 10 including a planetary gear power transmission 22 having a sun gear 24, and a planetary gear carrier 26 connected to the engine crankshaft 16. The planetary gear carrier 26 can support a plurality of planetary gears 28. A ring gear 30 can be integrally associated with the accessory drive pulley 14. The gears 24, 28, 30 can interact with one another. Each gear 24, 28, 30 can have a central axis and wherein, during at least one mode of operation, the axes of the planetary gears 28 follow a path extending around the axis of the sun gear 24 and ring gear 30.

The method can operate the accessory drive system 10 in a normal drive mode with the engine crankshaft 16 driving the accessory drive pulley 14, where the first one way clutch 32 located between the engine crankshaft 16 and the ring gear 30 is engaged and the second one way clutch 34 located between the sun gear 24 and a grounding member 36 is overrunning. In other words, the accessory drive pulley 14/ring gear 30 and planetary gear carrier 26 are driven in unison by the crankshaft 16 with respect to one another, i.e. no relative motion with respect to one another as a result of the first one way clutch 32 being engaged, while the sun gear 24 overruns, i.e. is disconnected with respect to the grounding member 36 in response to the second one way clutch 34 overrunning. In this mode of operation, the crankshaft 16 drives the starter motor/generator pulley 50, i.e. with the starter motor/generator 12 operating in generator mode, and drives at least one accessory driven pulley 18 and connected accessory 48.

The method can operate the accessory drive system 10 in an engine start mode with the starter motor/generator 12 driving the engine crankshaft 16, where the first one way clutch 32 is overrunning and the second one way clutch 34 is engaged. In other words, the accessory drive pulley 14/ring gear 30 is driven by the starter motor/generator 12. Rotation of the ring gear 30 interacts with the planetary gears 28 driving the planetary carrier 26 and connected crankshaft 16, while the sun gear 24 is held stationary by the grounding member 36 being connected to ground 42 through normally closed friction clutch 40 and the second one way clutch 34 being engaged. The accessory drive pulley 14/ring gear 30 overrun, i.e. are disconnected with respect to the crankshaft 16 in response to the first one way clutch 32 overrunning.

The method can operate the accessory drive system 10 in a free wheel mode with the electromagnetic disconnect 38 disengaging the normally closed friction clutch 40 to release the grounding member 36 from connection to ground 42, thereby allowing the accessory drive pulley 14 to be driven by the starter motor/generator 12. In other words, the accessory drive pulley 14/ring gear 30 is driven by the starter motor/generator 12. Rotation of the ring gear 30 interacts with the planetary gears 28 driving sun gear 24 and connected, through second one way clutch 34 being engaged, to grounding member 36, where both sun gear 24 and grounding member 36 free wheel with respect to the disconnected ground 42. The accessory drive pulley 14/ring gear 30 overrun, i.e. are disconnected with respect to the crankshaft 16 in response to the first one way clutch overrunning. The accessory drive pulley 14 can be driven at a 1 to 1 ratio with the engine crankshaft 16. The accessory drive pulley 14 can be driven at a ratio greater than 1.5 to 1 with the starter motor/generator 12.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In an accessory drive system of a motor vehicle having a starter motor/generator, an accessory drive pulley connected to an internal combustion engine crankshaft during at least one mode of operation, and an endless loop power transmission member connecting at least the starter motor/generator and the accessory drive pulley, the improvement comprising:
   a planetary gear power transmission having a sun gear interacting with a planetary gear carrier connect to the engine crankshaft, the planetary gear carrier supporting a plurality of planetary gears, each gear having a central axis and wherein, during at least one mode of operation, the axis of the planetary gears follows a path extending around the axis of the sun gear, and a ring gear integrally associated with the accessory drive pulley and interacting with the plurality of planetary gears;
   first and second one way clutches unidirectionally connecting the engine crankshaft to the ring gear, and the sun gear to a grounding member, respectively, to define two modes of operation corresponding to a normal drive mode, and an engine start mode, respectively; and
   an electromagnetic disconnect including a normally closed friction clutch connecting the grounding member to ground to define a third mode of operation corresponding to a free wheel mode with the grounding member disengaged from connection to ground allowing the accessory drive pulley to be driven by the starter motor/generator with the first one way clutch overrunning, the second one way clutch engaged, and the normally closed friction clutch electromagnetically driven open allowing the grounding member to freely rotate.

2. In an accessory drive system of a motor vehicle having a starter motor/generator, an accessory drive pulley connected to an internal combustion engine crankshaft during at least one mode of operation, and an endless loop power transmission member connecting at least the starter motor/generator and the accessory drive pulley, the improvement comprising:
   a planetary gear power transmission having a sun gear interacting with a planetary gear carrier connect to the engine crankshaft, the planetary gear carrier supporting a plurality of planetary gears, each gear having a central axis and wherein, during at least one mode of operation, the axis of the planetary gears follows a path extending around the axis of the sun gear, and a ring gear integrally associated with the accessory drive pulley and interacting with the plurality of planetary gears;
   first and second one way clutches unidirectionally connecting the engine crankshaft to the ring gear, and the sun gear to a grounding member, respectively, to define two modes of operation corresponding to a normal drive mode, and an engine start mode, respectively, wherein the normal drive mode includes the engine crankshaft driving the accessory drive pulley with the first one way clutch engaged and the second one way clutch overrunning; and
   an electromagnetic disconnect including a normally closed friction clutch connecting the grounding member to ground to define a third mode of operation corresponding to a free wheel mode with the grounding member disengaged from connection to ground.

3. The improvement of claim 2, wherein the engine crankshaft drives the accessory drive pulley at a 1 to 1 ratio.

4. In an accessory drive system of a motor vehicle having a starter motor/generator, an accessory drive pulley connected to an internal combustion engine crankshaft during at least one mode of operation, and an endless loop power transmission member connecting at least the starter motor/generator and the accessory drive pulley, the improvement comprising:
   a planetary gear power transmission having a sun gear interacting with a planetary gear carrier connect to the engine crankshaft, the planetary gear carrier supporting a plurality of planetary gears, each gear having a central axis and wherein, during at least one mode of operation, the axis of the planetary gears follows a path extending around the axis of the sun gear, and a ring gear integrally associated with the accessory drive pulley and interacting with the plurality of planetary gears;
   first and second one way clutches unidirectionally connecting the engine crankshaft to the ring gear, and the sun gear to a grounding member, respectively, to define two modes of operation corresponding to a normal drive mode, and an engine start mode, respectively, wherein the engine start mode includes the starter motor/generator driving the accessory drive pulley with the first one way clutch overrunning and the second one way clutch engaged; and
   an electromagnetic disconnect including a normally closed friction clutch connecting the grounding member to ground to define a third mode of operation corresponding to a free wheel mode with the grounding member disengaged from connection to ground.

5. The improvement of claim 4, wherein the starter motor/generator drives the accessory drive pulley at a ratio greater than 1.5 to 1.

6. The improvement of claim 4, wherein the starter motor/generator drives the accessory drive pulley to drive the engine crankshaft for engine starting to facilitate a stop start function of an internal combustion engine to yield improved fuel economy and reduced carbon dioxide emission.

7. In an accessory drive system of a motor vehicle having a starter motor/generator, an accessory drive pulley connected to an internal combustion engine crankshaft during at least one mode of operation, and an endless loop power transmission member connecting at least the starter motor/generator and the accessory drive pulley, the improvement comprising:
   a planetary gear power transmission set including a sun gear connected to a grounding member, a ring gear integrally associated with the accessory drive pulley, and a planetary carrier connected to the engine crankshaft and supporting a plurality of planetary gears interacting with the sun gear and the ring gear;
   first and second one way clutches unidirectionally connecting the engine crankshaft to the ring gear, and the sun gear to the grounding member, respectively, to define a normal drive mode of operation with the first one way clutch engaged and the second one way clutch overrunning, and an engine start mode of operation with the starter motor/generator driving the accessory drive pulley with the first one way clutch overrunning and the second one way clutch engaged; and an electromagnetic disconnect including a normally closed friction clutch connecting the grounding member to ground to define a free wheel mode of operation with the grounding member disengaged from connection to ground allowing the accessory drive pulley to be driven by the starter motor/generator.

8. The improvement of claim 7, wherein the engine crankshaft drives the accessory drive pulley at a 1 to 1 ratio.

9. The improvement of claim 7, wherein the starter motor/generator drives the accessory drive pulley at a ratio greater than 1.5 to 1.

10. The improvement of claim 7, wherein the starter motor/generator drives the accessory drive pulley to drive the engine crankshaft for engine starting to facilitate a stop start function of an internal combustion engine to yield improved fuel economy and reduced carbon dioxide emission.

11. The improvement of claim 7, wherein the free wheel mode includes the first one way clutch overrunning, the second one way clutch engaged, and the normally closed friction clutch electromagnetically driven open allowing the grounding member to freely rotate.

12. A method for driving accessories with a starter motor/generator in at least one mode of operation during absence of internal combustion engine crankshaft rotation with an accessory drive system including a planetary gear power transmission having a sun gear, a planetary gear carrier connected to the engine crankshaft and supporting a plurality of planetary gears, and a ring gear integrally associated with an accessory drive pulley, the gears interacting with one another, each gear having a central axis and wherein, during at least one mode of operation, the axes of the planetary gears follows a path extending around the axis of the sun gear and ring gear, the method comprising:

operating in a normal drive mode with the engine crankshaft driving the accessory drive pulley, where a first one way clutch located between the engine crankshaft and the ring gear is engaged and a second one way clutch located between the sun gear and a grounding member is overrunning;

operating in an engine start mode with the starter motor/generator driving the engine crankshaft, where the first one way clutch is overrunning and the second one way clutch is engaged; and operating in a free wheel mode with an electromagnetic disconnect disengaging a normally closed friction clutch releasing the grounding member from connection to ground allowing the accessory drive pulley to be driven by the starter motor/generator.

13. The method of claim 12 further comprising:

driving the accessory drive pulley at a 1 to 1 ratio with the engine crankshaft.

14. The method of claim 12 further comprising:

driving the accessory drive pulley at a ratio greater than 1.5 to 1 with the starter motor/generator.

\* \* \* \* \*